United States Patent
Poole (10) Patent No.: US 11,304,407 B2
(45) Date of Patent: Apr. 19, 2022

(54) METHOD AND DEVICE FOR WEANING CALVES

(71) Applicant: Kevin Taylor Poole, Winchester, KY (US)

(72) Inventor: Kevin Taylor Poole, Winchester, KY (US)

(*) Notice: Subject to any disclaimer, the term of this patent is extended or adjusted under 35 U.S.C. 154(b) by 0 days.

(21) Appl. No.: 17/188,216

(22) Filed: Mar. 1, 2021

(65) Prior Publication Data
US 2021/0267169 A1 Sep. 2, 2021

Related U.S. Application Data

(60) Provisional application No. 62/983,904, filed on Mar. 2, 2020.

(51) Int. Cl.
*A01K 1/00* (2006.01)
*A01K 19/00* (2006.01)

(52) U.S. Cl.
CPC ............ *A01K 19/00* (2013.01); *A01K 1/0017* (2013.01); *A01K 1/0088* (2013.01)

(58) Field of Classification Search
CPC ...... A01K 1/0017; A01K 1/0088; A01K 9/00; A01K 19/00
USPC ............................................. 119/71, 72, 524
See application file for complete search history.

(56) References Cited

U.S. PATENT DOCUMENTS

| 4,600,585 | A | | 7/1986 | Vitcenda et al. |
| 5,074,248 | A | * | 12/1991 | Loader ................. A01K 19/00 119/505 |
| 7,160,552 | B2 | | 1/2007 | Miller et al. |
| 7,814,863 | B2 | * | 10/2010 | Hare .................... A01K 5/0216 119/73 |
| 8,245,664 | B2 | * | 8/2012 | Mulder ................. A01K 29/00 119/51.01 |

FOREIGN PATENT DOCUMENTS

| EP | 0445762 A1 | 6/1991 |
| GB | 2540808 A | 1/2017 |
| WO | 2018197618 A1 | 11/2018 |

* cited by examiner

*Primary Examiner* — David J Parsley
(74) *Attorney, Agent, or Firm* — Michael Coblenz (57) ABSTRACT

A method for weaning calves from their mothers without direct human intervention. The method consists of a specialized weaning gate that allows calves to creep graze into an adjacent paddock but does not allow the mother to follow. The gate allows the calves to return to the mothers, to acclimate the calves to moving through the gate and grazing independently and to acclimate the mothers to being temporarily separated from the calves. Once the calves have reached the appropriate age to be weaned, the gate is adjusted to become a one-way gate so that the calves will creep graze into the adjacent field but will not be able to return to the original field with the mothers, which allows the calves to be fully weaned without direct human intervention.

6 Claims, 8 Drawing Sheets

METHOD AND DEVICE FOR WEANING CALVES

CROSS REFERENCE TO RELATED APPLICATIONS

This application claims priority to U.S. provisional application Ser. No. 62/983,904 filed on Mar. 2, 2020, and fully incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to a method and a specialized gate for weaning calves.

Description of the Related Art

Calves are born with a single stomach, and must begin eating grass for the other stomachs and its digestive system to develop normally. Typically, a calf will suckle at its mother for the first day, but by the second day will begin nibbling grass. Eating grass is important for stomach development and so the calf will eventually be able to tolerate dry feed or roughage. Because milk is highly nutrient dense, the longer a calf continues to suckle, the less appetite it will have for other food sources, like dry feed. So it is important for the development of the calf to begin easting grass, and then to wean it off of its mother as soon as possible. The development of the rumen, which is the first stomach of a ruminant animal like cattle, depends on eating grass. The rumen develops quicker if the calf begins grazing grass earlier.

Weaning the calf from the mother is important for both the mother and the calf. If the mother is being milked, the milk present in its udder in the first day after birth is called colostrum and is not suitable for human consumption. The mother's milk returns to normal within 24 hours or so. Dairy cows are often weaned fairly soon after birth, which allows the mother to produce salable milk. Other cows are typically weaned latter, but it is important to wean cows before about 7 or 8 months so that the mother can regain proper condition to produce a calf each year. Mother cows that are weaning young tend to lose weight, and tend to require a high caloric intake, so it is important to wean the calf from the mother as soon as possible so that the mother cow can regain weight in order to produce a calf for the next season. It can also be expensive, particularly during winter months when grazing pastures are limited, to provide additional feed to a nursing mother. Cattle raised for beef are often not weaned for as long as 7 or 8 months. During this period the calf will spend time nursing with the mother, but will also spend time eating grass. While the calf is grazing it will typically wander away from the mother and then wander back, which is commonly called creep grazing, because the calf creeps away from the mother. In many cases the mother will follow the calf as it wanders.

One of the most common methods used to wean calves from their mothers is to have two paddocks, and when the time has come to wean the calf it is physically separated and herded into a paddock separate from its mother. Mother cows are distressed by the cries of their calves, and will attempt to get to its calf. A mother cow can weight upwards of 1500 pounds, and so the process can be dangerous for the humans involved, and stressful for the animals. The two paddocks will be adjoining and will have a fence between the mothers and calves. The mother will be drawing to the crying of its calf, but will be unable to nurse the calf. This is known as fence line weaning. Mothers are physically distressed by the crying of its calf, but will be partially calmed by the physical closeness on the fence line. This process is stressful for the animals, and dangerous for the people who have to physically separate the animals. Even at a young age, calves can weigh much more than even a large man, often upward of 400 pounds depending upon when the calf is weaned. It is very common for all of the calves in a herd to be weaned at the same time, so the people doing the weaning are in a paddock full of scared calves and upset cows. This makes it particularly dangerous for the humans involved, and particularly stressful for the mother cows. There is a need, therefore, for a way to wean calves from mothers that requires no direct human interaction with the animals, and operates in a way that minimizes stress on the mother cows and the calves.

SUMMARY OF THE INVENTION

This invention consists of providing two grazing paddocks with a specialized weaning gate in between the two paddocks. Mother cows with newborn calves are grazed in one of the paddocks. Young calves will spend time suckling at their mother, and spend time nibbling the grass or other grazable foliage such as clover. The calves wander away from their mothers as they graze, and at some point will go through the weaning gate into an adjacent paddock with fresh grass. The weaning gate is adjustable and can be sized so that the calves but not the mothers can go through the gate into the fresh paddock. This acclimates the calves to going into a new paddock and going through the specialized gate, and to being separated from their mothers. This also acclimates the mother to being temporarily separated from its calf. The weaning gate allows the calves to go in and out of the adjacent paddock and then return to suckle with their mothers. Once the calves have reached a pre-determined age, when their rumen has started to develop, and they are ready to be weaned, the weaning gate is further modified to be a one-way gate. The weaning gate includes telescoping vertical arms so that it can be configured based on the size of the calves. Once the weaning gate becomes a one-way gate, the calve will wander away from their mothers as they graze, and will go through the gate to the new paddock but will then be prevented from returning to their mothers. This will allow the calves to be weaned without the need for a human to be involved in the weaning process, and will be less stressful on the mother cows.

The invention consists of a method for weaning calves from their mothers by enclosing a field of grazable foliage with at least two grazing paddocks, wherein a first paddock is a nursing paddock and a second paddock is an independent paddock; creating an opening between said nursing paddock and said independent paddock; providing a weaning gate at said opening, wherein said weaning gate can be adjusted both vertically and horizontally to allow calves but not mothers to go through said weaning gate into said independent paddock and then return to said nursing paddock, and wherein further said weaning gate can be turn into a one-way gate to allow the calves to go into the independent paddock but not return to the nursing paddock; introducing a multiplicity of mother cow (mothers) with their new-born calves into said nursing paddock; allowing said calves to nurse with said mothers and also to graze; allowing said calves to wander away from said mothers while grazing, such that said calves will go through said weaning gate into the independent paddock and then return through the weaning gate to the nursing paddock with their mothers, thereby acclimating said calves to grazing separate from said mothers, and acclimating said mothers to being separated from their calves; determining when said calves are old enough to be weaned; adjusting said weaning gate to become a one-way gate; allowing said calves to enter said independent paddock through said one-way gate which will then prevent said calves from returning to said nursing paddock, wherein said calves are weaned from their mothers. This method further includes providing a top horizontal bar at the top of said opening, and a bottom horizontal bar at the bottom of said opening; introducing a multiplicity of vertical bars having an adjustable top clamps to attach to said top horizontal bar and an adjustable bottom clamp to attach to said bottom bar; sliding said vertical bars horizontally to adjust the horizontal opening of said weaning gate. And also includes providing at least two adjustable horizontal bar mounts having hinge loops, wherein said horizontal bar mounts are configured to adjustably attach to said vertical bars; attaching said adjustable horizontal bar mounts to at least two of said vertical bars; adjusting the height of said adjustable horizontal bar mounts; inserting an elongated pin into said hinge loops to create a bar across said opening to adjust the vertical opening of said weaning gate.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

The invention consists of a process for weaning a calf and the use of a specialized gate situated between two grazing pastures or paddocks to achieve this weaning process without human interaction with the animals. Ranchers or owners of herds of cattle typically arrange for the impregnation of the mother cows so that they give birth at roughly the same time, often referred to as calving season. Typical calving seasons are early spring or late summer/early fall. This means that a paddock will be filled with numerous mother cows M and recently born calves C. Calves C will often begin nibbling grass within a few days of birth but will continue to get most of their nutrition from their mother M for the first six weeks or so. Eating grass is necessary for the development of the rumen, and the earlier that calves C begin eating grass the earlier the rumen begins to develop. Typically after a few weeks the calves C will start to wander or creep away from the mother M to graze, but not far. As the calves C grow they will typically creep further and further away, typically in the company of other calves. The mothers M will usually stay near their calves C, and graze near them. Calves will typically creep away and graze, and seek out fresher grass. If there are adjacent paddocks with fresh grass the calves C will often wander into those separate areas.

Figure 1:
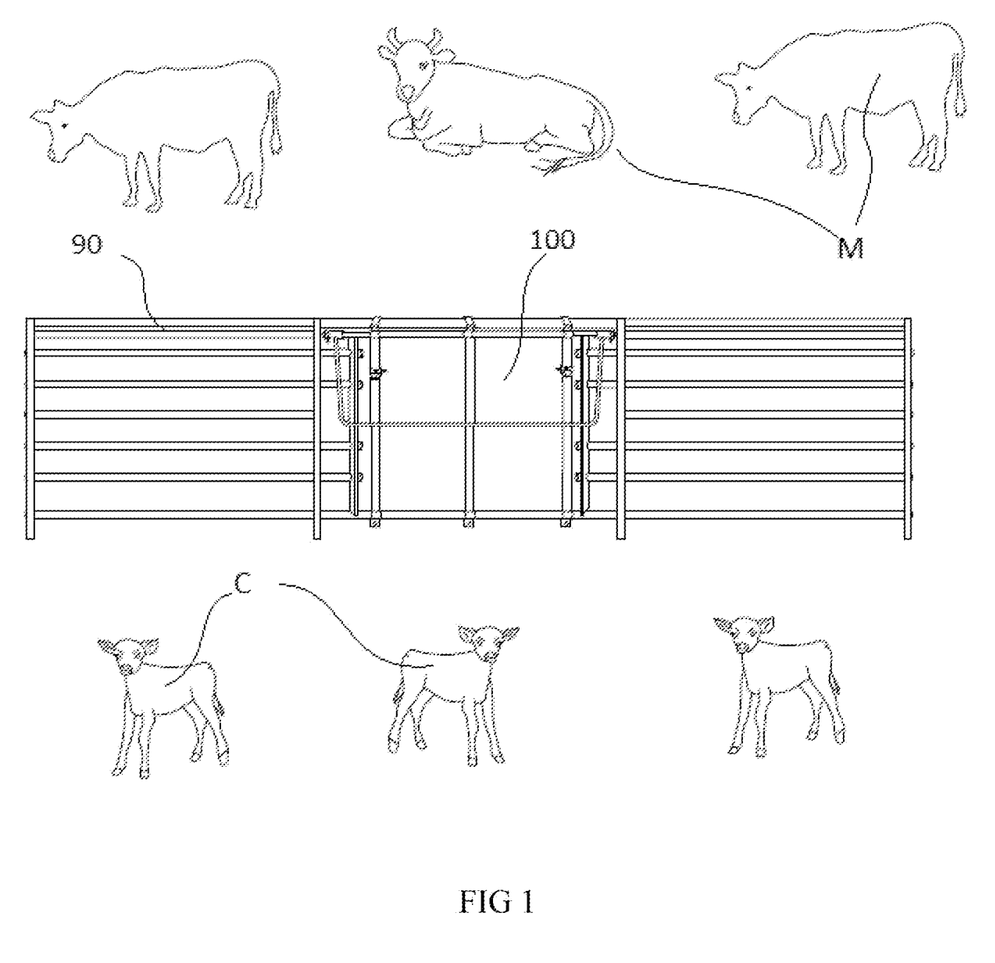
FIG. 1 is a schematic view of a fence with the specialized weaning gate between fields of calves and mothers.
Figure 3:
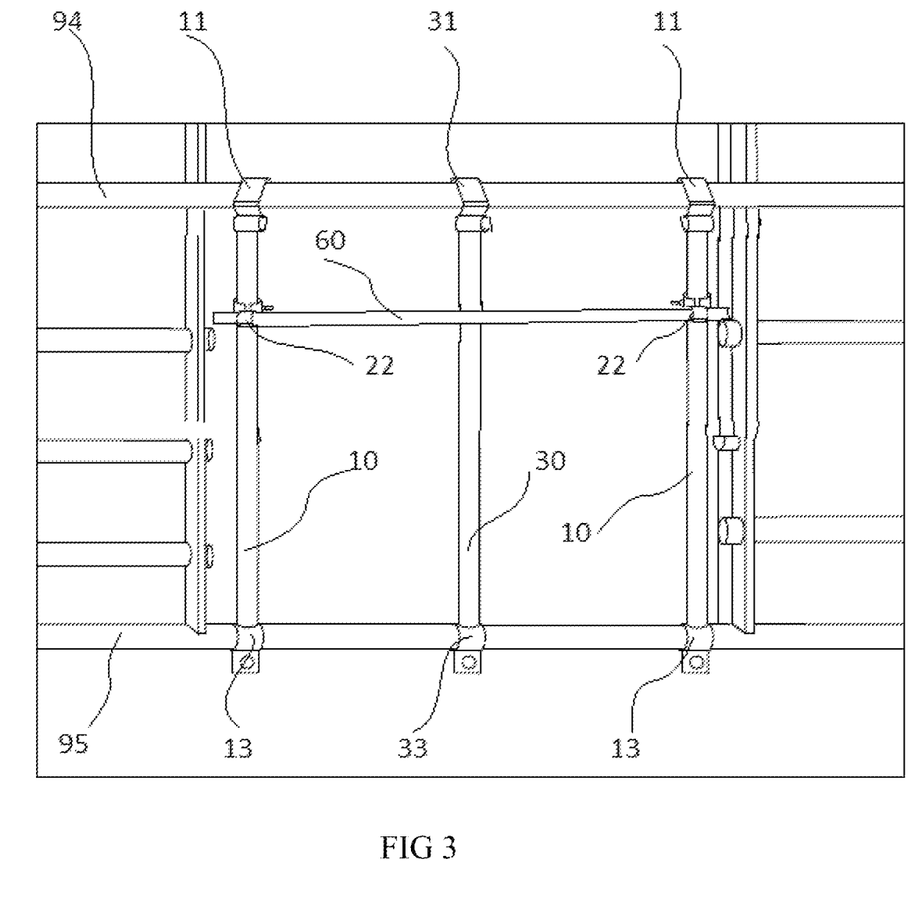
FIG. 3 is a front view of the weaning gate with the elongated pin inserted into the adjustable mount.

When calves C begin to wander and graze into separate paddocks away from their mothers M the specialized weaning gate 100 can be used, as shown in FIG. 1. The weaning gate 100 is sized with parallel vertical bars 10 & 30 that are spaced such that the mothers M cannot also go through the gate in the adjacent paddock. The vertical bars 10 & 30 are adjustable so the space between them can vary, but in the preferred embodiment they are spaced between 18 and 24 inches apart. This is wide enough for a calf C to get through, but is too narrow for the mother M to fit her shoulder's through, so she will not be able to enter the adjacent paddock through the weaning gate 100. This allows the calves C to become acclimated to walking through the weaning gate 100, acclimated to grazing separate from the mothers M, and also allows the mothers M to become acclimated to the calves C wandering off and then returning. This is referred to as "training mode" of the weaning gate 100. As seen in FIG. 3, the two outside vertical bars 10 also include an adjustable horizontal bar mount 20 (as described fully below) that can be used to adjust the height of the elongated pin 60 up or down to alter the vertical size of the opening of the weaning gate 100 so that it can be sized to accommodate different sized calves C. As the calves C grow the elongate pin 60 height can be adjusted to accommodate them.

The paddocks for animals are typically created by fencing off areas of grazing fields or pastures. Fences can be custom build on site, or in many cases multiple fence panels can be brough on site and attached or connected to create fencing around the entire paddock. Fence panels have attachment components on each side so that they can be easily connected to quickly and easily fence in an area to create a paddock. These fence panels can be temporarily set on the ground, or can also be inserted into the ground to create permanent fencing. In many cases a land-owner will use a combination of the two, permanent fencing and temporary fencing. This allows the farmer or rancher to modify the size of various paddocks as needed. The specialized weaning gate 100 of the present invention can be used with, or attached to, either type of fencing. In the preferred embodiment the weaning gate 100 used with heavy duty metal fence panels 90, because of the size of the animals. In the preferred embodiment, shown in FIG. 2, the specialized weaning gate 100 is used with a five-bar fencing panel 90. The adjustable components of the invention, as described fully below, allow the weaning gate 100 to be used with most standard cattle or animal fencing. For the purposes of this invention, the first paddock where the mothers M and calves C graze together is called the nursing paddock, and the second paddock where the calves C can graze without their mothers M is called the independent paddock.

Figure 2:
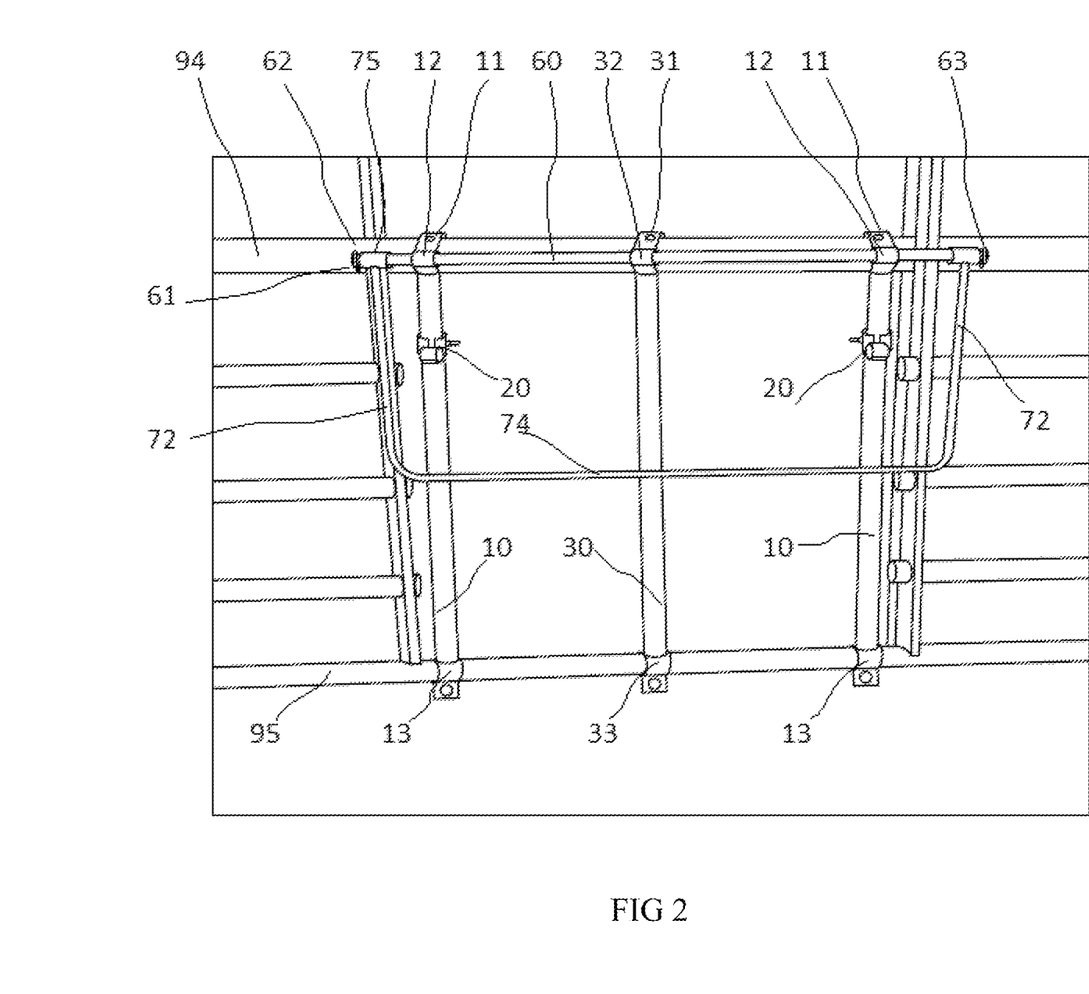
FIG. 2 is a front view of the weaning gate showing the main components and with the horizontal swinging gate attached.

The components of the weaning gate 100 are show in FIG. 2. The weaning gate 100 consists of five major components: three vertical bars 10 & 30, an elongated hinge pin 60, and a swinging horizontal bar gate 70. FIG. 2 shows the weaning gate 100 attached to a standard fence panel 90. The standard fence panel 90 has vertical support posts 91 and multiple horizonal bars 92, a top horizontal bar 94, and a bottom horizontal bar 95. In the embodiment shown in FIG. 2, in one of the panels the middle horizontal bars 92 are removed between two of the vertical support posts 91. This creates an opening that is approximately 4 feet wide and approximately 3 feet tall. The top horizontal bar 94 and bottom horizontal bar 95 are not removed because they are an important part of attaching the weaning gate 100, and also important for the operation of the weaning method. In the preferred embodiment the top 94 and bottom 95 horizontal bars are 37 inches apart. In the preferred embodiment the horizontal bars of the fence panel are made of heavy duty 2¼ inch steel. This is the common size of the steel fencing used for cattle because of the size of a full grown cow or bull, but it is understood that the bars of the fencing panels can be different dimensions, though much below a 1 inch diameter would simply be to small to properly contain cattle. The three vertical bars 10 and 30 of the specialized gate are made of the same sized steel tubing as the horizontal bars of the fencing. FIG. 3 shows the gate without the swinging horizontal bar gate 70, but with the elongated pin 60 attached to the adjustable horizontal bar mount 20 to create the training mode of the weaning gate 100 for different sized calves C.

Figure 4:
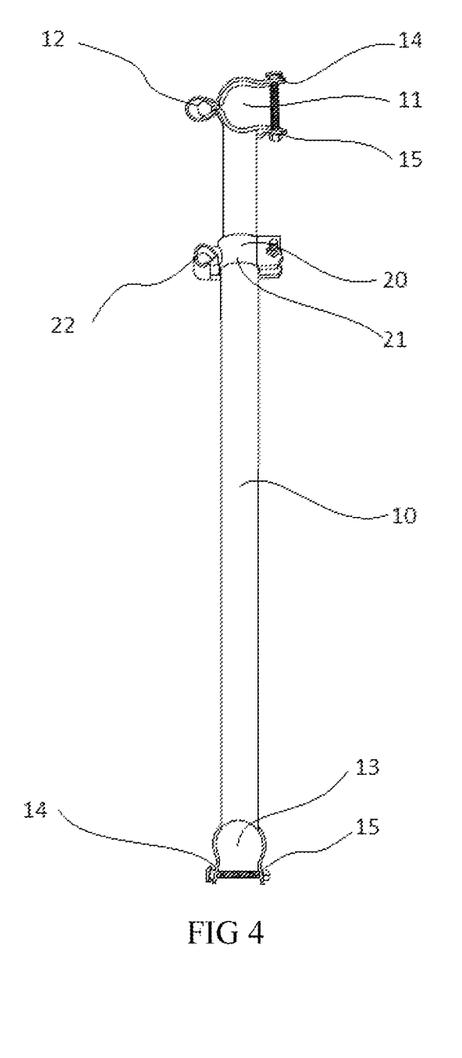
FIG. 4 is a front view of the vertical bar.

FIG. 4 shows the details of the outside vertical bar 10. There are two outside vertical bars 10 and one middle bar 30. In the preferred embodiment the vertical bars 10 and middle bar 30 are made of the same 2¼ inch diameter steel tubing as the fence components. The middle vertical bar 30 is the same as the outside vertical bars 10, but without the adjustable hinge 20, as described below. The outside vertical bar 10 has at the bottom a vertical bottom open brace clamp 13 that is configured to vertically attach to the bottom horizontal bar 95 of the fence panel 90. The vertical bottom clamp 13 has cylindrical side walls and is sized to fit over and attach to the bottom horizontal bar 95. In the preferred embodiment it is made of a strip of 2 inch wide steel that is bent into a partial semi-circle and with two flat end tabs 14 that will extend past the fence bar (94 or 95) when attached, and with corresponding holes 15 on the end tabs. This allows the bottom clamp 13 to be easily attached to the bottom horizontal bar 95. The strip of metal is welded to the bottom of the tube (10 or 30) so that the open end is downwardly aligned with the bar 10 or 30. There is a standard 5/16 carriage bolt with a nut to securely attach the vertical bottom clamp 13 to the bottom horizontal bar 95 through the corresponding holes 15 at the ends of the tabs 14. The middle vertical bar 30 has a bottom vertical clamp 33 that is identical to the vertical bottom clamp 13 of the outside vertical bar 10.

Figure 5:
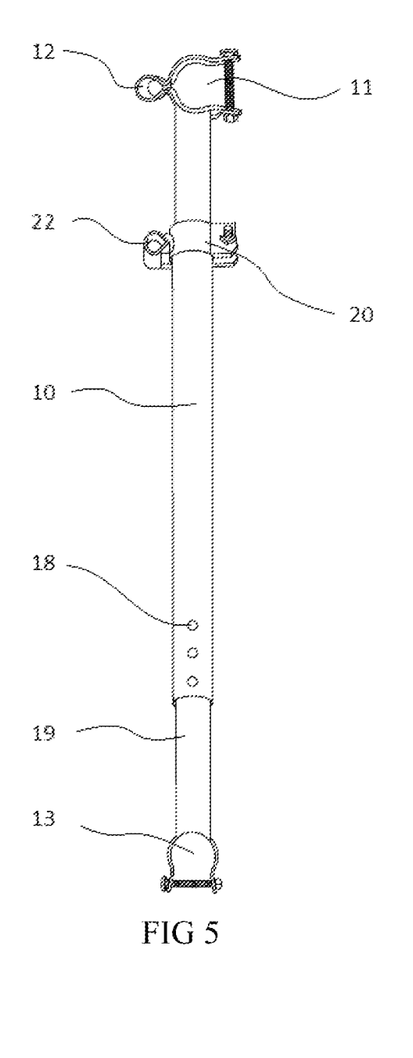
FIG. 5 is a front view of an alternate embodiment of the vertical bar with a telescoping member.

At the top of each vertical bar 10 or 30, there is a horizontal top open brace clamp 11 or 31 that has cylindrical side walls and is sized to fit over the top horizontal bar 94 of the fence panel 90. The clamps 11 and 31 are also made, in the preferred embodiment, of a strip of 2 inch steel bent into an open ended "C" shaped half-or-semi-circle clamp with two flat extending tabs having corresponding holes. There is a standard 5/16 carriage bolt with a nut that runs through the corresponding holes to securely attach the horizontal top clamp 11 and 31 to the top horizontal bar 94. In use the vertical bars 10 and 30 are placed onto the bottom horizontal bar 95 from the top and then rotated so that top horizontal clamp 11 or 31 is snapped into placed over the top horizontal bar 94 to lock the vertical bars 10 or 30 into place. The top clams 11/31 and bottom clamps 13/33 allow the bars 10 and 30 to be spaced based on need. The bars 10 and 30 are typically spaced at around 24 inches apart, which is wide enough to allow a calf C through, but typically not the mother M. But the bars 10 & 30 can be narrowed if necessary. The different orientations of the top and bottom brace clamps increases the structural strength of the vertical bars. In the preferred embodiment the top horizontal bar 94 and the bottom horizontal bar 95 and 37 inches apart, so the center of the semi-circle clamps 11 and 13 (or 31 and 33) are 37 inches apart. It is to be understood, and is within the conception of the invention, that the top horizontal bar 94 and the bottom horizontal bar 95 can have different separations, and it is understood that the vertical bars 10 and 30 can be different sizes to accommodate these different separations. In the alternate embodiment, shown in FIG. 5, the vertical bars 10 and 30 can be telescoping, with a smaller bottom tube 19 sized to fit securely inside the larger outside tube 10 or 30 to allow the length of the bars 10 and 30 to vary according to need. In this embodiment there are two opposing holes at the inside end of the smaller tube 19 (not shown) with a button clip inserted, and a series of opposing spacing holes 18 (on opposite sides of the tube 10 or 30) that are one inch apart along the tube 10 or 30, to allow the total length of the vertical bar 10 or 30 to be adjusted based on need. These types of telescoping tubes, with button clips and spacing holes are known.

Each of the three vertical bars 10 (×2) and 30 have a gate hinge 12 and 32 located at the top and behind the top vertical clamp 11 or 31. In one embodiment, shown in FIG. 5, the gate hinge 12 (or 32) is made of the same piece of bent steel that forms the top vertical clamp 31, which is bent to form a loop to create the gate hinge 12 (or 32), and then bent to form the vertical top clamp 11 or 31. The piece of metal is then welded to the top of the vertical bar 10 or 30. The loops that creates the gate hinges 12 and 32 are sized to be just slightly larger than the outside diameter of the elongated pin 60 so that the pin 60 can be easily slid through and will easily rotate within these gate hinges 12 and 32. In an alternate embodiment there can be a bushing used with the hinge loop, in which case the loop will be sized to hold the bushing and the elongated pin 60 will sit in the bushing. In this alternate embodiment a silicon bushing will be preferred to smooth the rotation of the pin and the hinges.

The two outside vertical bars 10 each include a sliding adjustable horizontal bar mount 20, that can slide up and down on the outside vertical bars 10, which allows the height of the elongated pin 60 to be adjusted to allow the rancher to control the size of the calves C that can go through the weaning gate 100 in training mode. It is also possible to attach the swinging horizontal gate bar 70 to the elongated pin 60 on the horizontal bar mount 20, to lower the gate. The adjustable hinge mount 20 includes a hinge mount clamp 21 that is a cylindrical clamp to fit around the outside vertical bars 10 and includes extended tabs with two holes and a standard 5/16 nut and bolt to secure the adjustable hinge mount 20 into place. This is essentially the same as the piece of bent steel used for the clamps 11 and 13 described above. It also includes a hinge loop 22 that sits on the back of the hinge mount 20. The hinge loop 22 can be welded to the hinge mount 20, or attached in any other suitable manner. The hinge loop 22 is sized to hold the elongated pin 60. As with the gate hinges 12 and 32 described above, in an alternate embodiment the hinge loop 22 can incorporate a bushing. These two adjustable horizontal bar mounts 20 can be slid up and down the adjust the height of the hinge loop 22 which thereby adjusts the height of the elongated pin 60 to alter the size of the opening in the weaning gate 100 as shown in FIG. 3.

Figure 6:
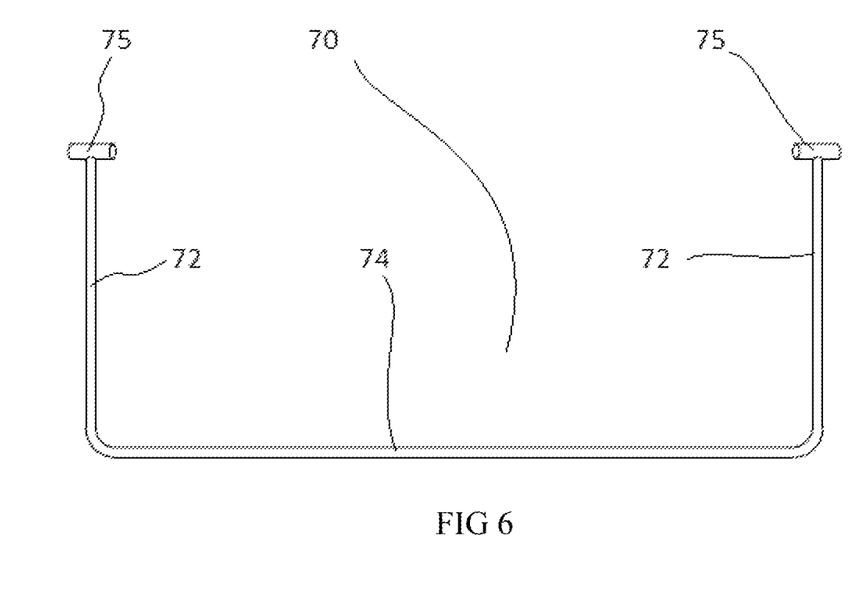
FIG. 6 is a front view of the swinging horizontal gate component.

FIG. 6 shows the swinging horizontal gate bar 70, which when attached to the elongated pin 60 in the hinges 12 and 32, creates the main components of the weaning gate 100. In the preferred embodiment the swinging horizontal gate bar 70 is made of aluminum because it is both light and strong. It needs to be light because it will be used with smaller calves C, but it also needs to be strong because it will also be used with larger animals including the mothers M. The swinging gate bar 70, as seen in FIG. 6, is a substantially flat "U" shaped bar that consists of a bottom horizontal element 74, two vertical sides 72, and at the top of each of the vertical sides 72 is a tube end hinge 75. In the preferred embodiment the horizontal element is 48 inches long and the vertical sides 72 are 18 inches tall. The tube end hinges 75 are short pieces of tubing that are slid over the elongated pin 60 and which allow the swinging gate bar 70 to rotate freely and swing around the elongated pin 60 when in position. That means that the tube end hinges 75 are sized to be just slightly larger in inside diameter than the outside diameter of the elongated pin 60. In an alternate embodiment a bushing, particularly a silicon bushing, can be used in place of, or in addition to, the end hinges 75.

Figure 7:
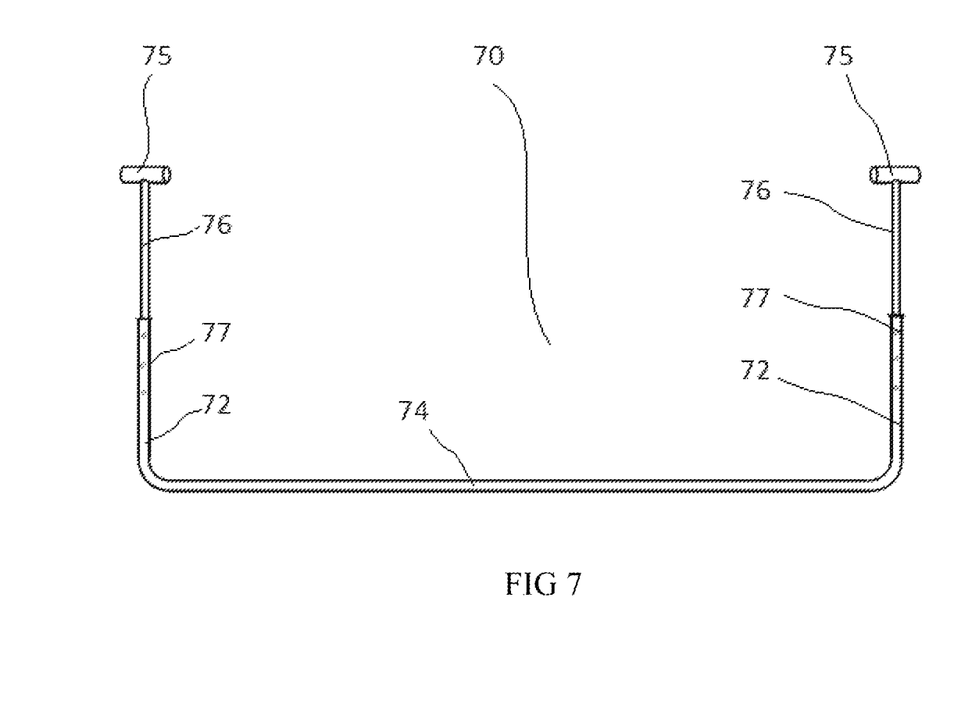
FIG. 7 is an alternate embodiment of the swinging horizontal gate with telescoping vertical arms.

In an alternate embodiment, shown in FIG. 7, the vertical sides 72 of the horizontal bar gate 70 include a telescoping feature to allow the adjustment of the length of the vertical sides 72, which allows the raising and lowering of the horizontal element 74 of the bar gate 70. In this embodiment the vertical sides 72 are hollow tubes, and there is a smaller inner tube 76 that fits within the tube of the vertical side 72, and has end holes and a button clip, and the vertical sides 72 includes a series of evenly spaced spacing holes 77, that allow the length of the vertical sides 72 to be adjusted. Such telescoping tubes are known in the art.

The elongated pin 60 is a bar that is roughly 52 inches in length and is a standard one-inch outer diameter rod. In the preferred embodiment it is a steel rod. The elongated pin 60 must be made of a strong material because in training mode it is used to stop the mother cows M from following the calves C into an adjoining paddock, and so must be strong. It is understood that the dimension of the rod comprising the elongated pin 60 can vary depending upon the needs of the gate. There is a slightly enlarged knuckle 63 on one end of the pin 60 that is created by welding. The knuckle 63 is larger than the tubes of the various hinges, i.e. the top hinges 12 and 32 and the hinge loops 22 of the adjustable horizontal bar mount 20, so that the elongated pin 60 can be inserted into the hinges, run through them all, and not slide out in that direction. On the other end of the elongated pin 60 there is an attachment hole 61 and a cotter pin 62 that fits into the hole to hold the elongated pin 60 in place within the hinges. The cotter pin 62 can be seen in FIG. 2 and FIG. 8, but the hole 61 is obscured in the drawing by the cotter pin 62.

Figure 8:
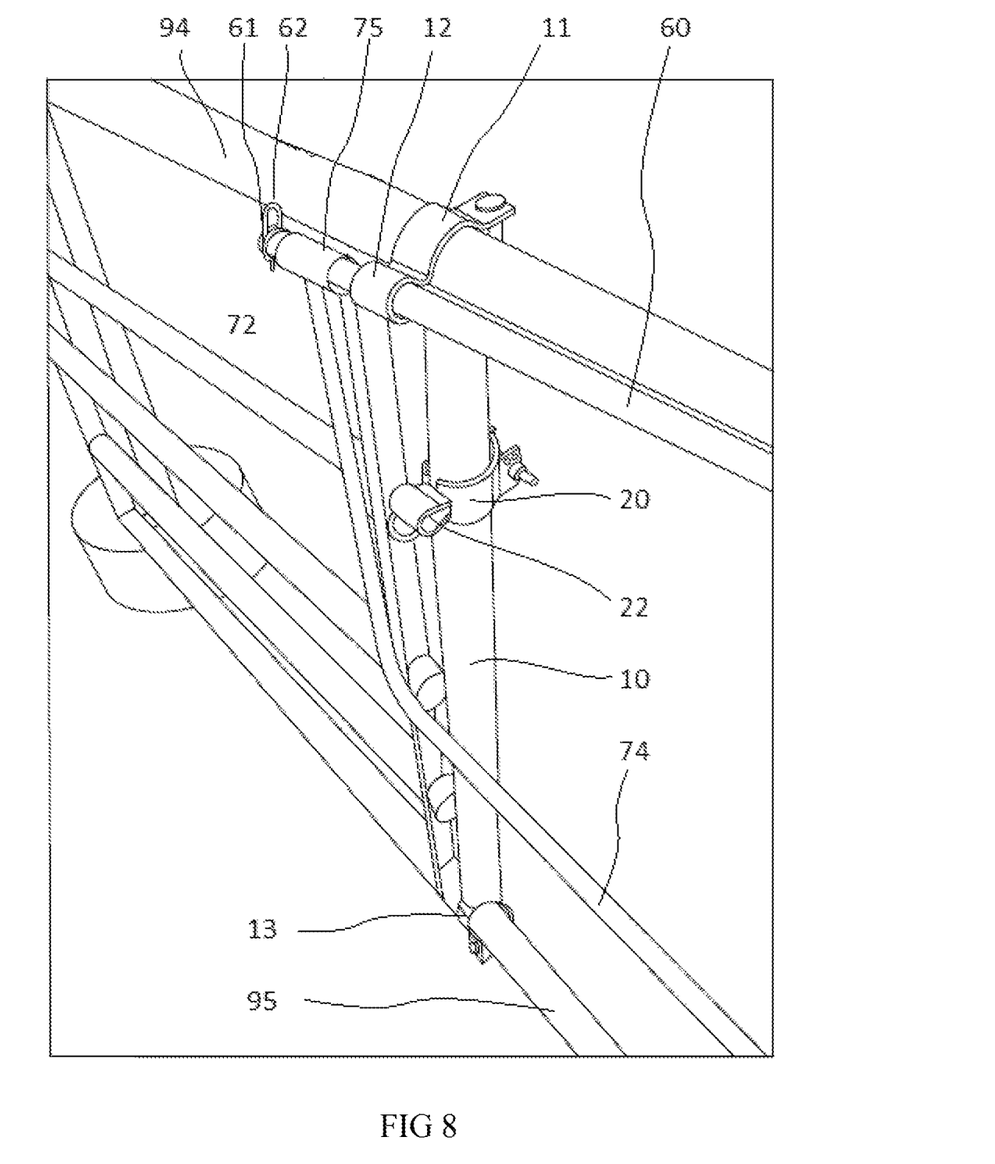
FIG. 8 is a detailed view of the top hinge on the outside vertical bar, the elongate pin, and the swinging gate and hinge on the elongate bar.
Figure 9:
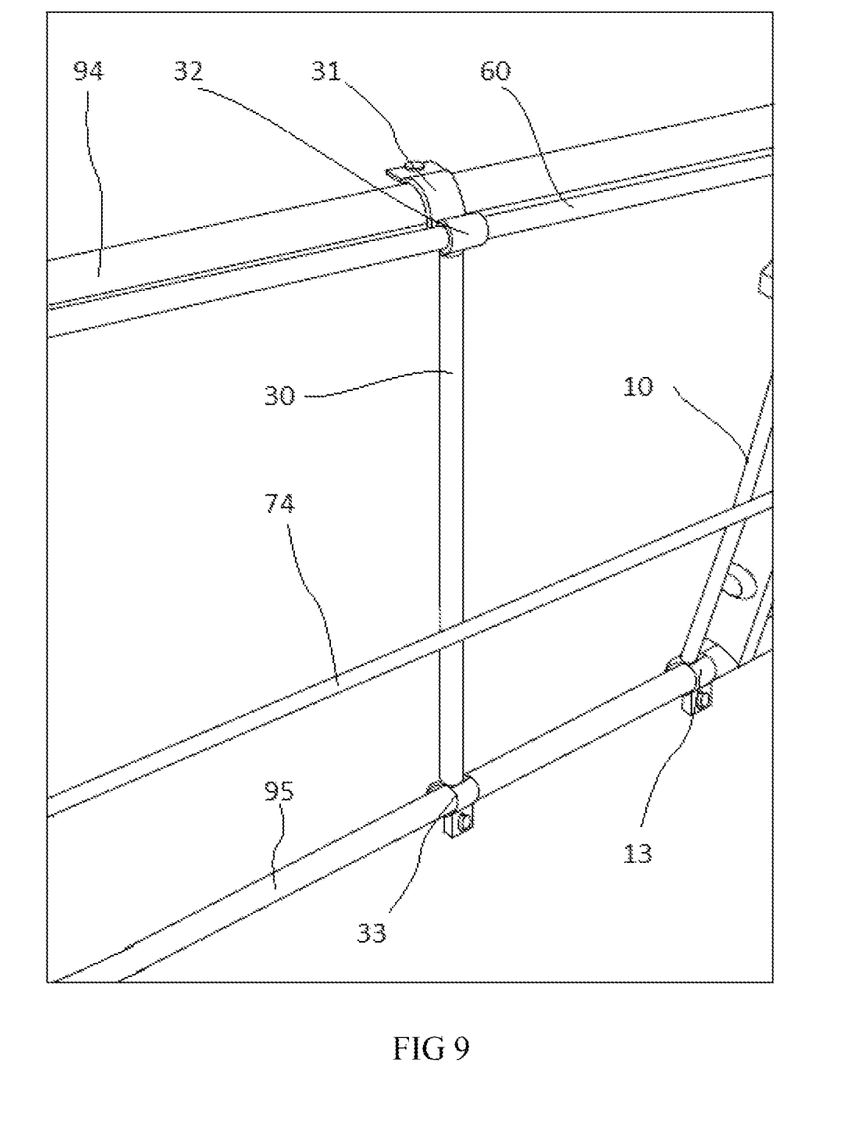
FIG. 9 is a detailed view of the top hinge on the middle vertical bar, the elongated pin, and the swinging gate.

FIG. 8 and FIG. 9 are details showing one of the outside vertical bars 10 attached to the fence 90. As can be seen the top horizontal clamp 11 is attached over the top horizontal bar 94 and secured into place by means of a bolt and nut, and the bottom vertical clamp 13 is attached to the bottom horizontal bar 95 and secured into place by means of the bolt and nut (Note only the outside of the nut or head of bolt are shown depending on the orientation.) The elongated pin 60 is inserted through the first tube end hinge 75, the first top hinge 12 of the first vertical bar 10, the top hinge 31 of the middle bar 30, the top hinge 12 of the second vertical bar 10, and the second tube end hinge 75 to attach the swinging horizontal bar gate 70 to the weaning gate 100, and secured in place by inserting the cotter pin 62 into the hole 61. As can be best seen in FIG. 8, the distance between the tube end hinges 75 of the swinging horizontal bar gate 70 is larger than the separation of the two outside vertical bars 10, such that the tube end hinges 75 sit outside of the top hinges 12. The elongated pin 60 is inserted from one end and runs through the first tube hinge end 75, the first top hinge 12, the middle bar top hinge 32, the second top hinge 12 and the second tube hinge end 75. The knuckle 63 end stops at the first tube end hinge 75, and the cotter pin 62 is inserted into the hole 61 to secure the elongated pin 60 in place. The swinging horizontal gate bar 70 can now swing, but because it is positioned on one side of the vertical bars 10 and 30 it can only swing outward, and is therefore a one-way gate.

In use, the two outside vertical bars 10 are attached to the opening in the fence 90, and the middle vertical bar 30 is inserted in the middle, thus setting up the weaning gate 100 in training mode. As noted, the spacing can be adjusted, but typically is around 24 inches between the outside bars 10 and the middle bar 30. This creates an opening that is large enough for a small calf C to go through, but far too small for a mother M cow to get through. The mothers M and new-born calves C are in the first paddock. Typically the calves C are born in the paddock. The calves C will begin to nurse almost immediately after birth, and within a day or so will begin to nibble grass. Within a few days the calves C will begin to creep graze away from the mothers M, and then, when they are a month or so old they will actually creep graze into the adjacent paddock through the weaning gate 100. During this period the weaning gate 100 will be in training mode, without the horizontal bar gate 70, but depending upon the size of the mother cows M, may include the elongated pin 60 in the adjustable horizontal bar mounts 20. This will prevent the mothers M from follow the calves C into the adjoining paddock. The paddocks will have the fence 90 separating them so the mothers M can be physically close to their calves C, but not in the same paddock. And the calves C will continue to return to their mothers M, so neither will become stressed.

Because the calves C are eating more grass, their rumens will develop well, and they can be weaned at a younger age. Weaning the calves at a younger age allows the mothers M to more quickly regain strength. Once the rancher or cattle owner determines that the calves C are mature enough, the swinging horizontal bar gate 70 can be added, which will prevent the calves C from returning to the original field with its mother M. The calves C will be fully acclimated to going through the weaning gate 100, and the mothers M will also be acclimated to their offspring creeping away to graze. The calves C will creep graze away from their mothers M and will creep through the weaning gate 100. The swinging horizontal bar gate 70 is made from aluminum or other light material, and the calves C will simply push the gate 70 out of the way and go into the adjacent paddock. The horizontal bar gate 70 will swing closed behind them. The vertical bars 10 and 30 prevent the gate 70 from swinging backwards, which will prevent the calves C from returning to the first field with their mothers M. But at this point the calves C are acclimated to being away from their mothers M, and are used to feeding primarily on grass, they will simply wander away from the gate 100 and continue grazing. They will not cry because they are acclimated to the separation, and so the mothers M will not become agitated due to the separation from their young. And because the mothers M have been acclimated to the separation as well, they will not be agitated when their calves C do not return. It typically takes a few days for all of the young calves C in a herd to creep into the separated corral from the mother cows M. The adjustable hinges 20 allow the rancher to adjust the height of the opening of the weaning gate 100 to control the size of the calves C to be weaned. This is anywhere from 2-3 months to 6-8 months.

The adjustability of the spacing between the vertical bars 10 and 30, the adjustable vertical bars 10 of the alternate embodiment, and the adjustable vertical sides 72 of the horizontal gate 70 allow the weaning gate 100 to be used with a wide variety of fences, as well as different animals, including, but not limited to sheep and pigs.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A method for weaning calves from their mothers consisting of the steps of:
    enclosing a field of grazable foliage with at least two grazing paddocks, wherein a first of the grazing paddocks is a nursing paddock and a second of the grazing paddocks is an independent paddock;
    creating an opening between said nursing paddock and said independent paddock;
    providing a weaning gate at said opening, wherein said weaning gate can be adjusted both vertically and horizontally to allow calves but not mothers to go through said weaning gate into said independent paddock and then return to said nursing paddock, and wherein further said weaning gate can be turn into a one-way gate to allow the calves to go into the independent paddock but not return to the nursing paddock;
    introducing a multiplicity of mother cow (mothers) with their new-born calves into said nursing paddock;
    allowing said calves to nurse with said mothers and also to graze;
    allowing said calves to wander away from said mothers while grazing, such that said calves will go through said weaning gate into the independent paddock and then return through the weaning gate to the nursing paddock with their mothers, thereby acclimating said calves to grazing separate from said mothers, and acclimating said mothers to being separated from their calves;
    determining when said calves are old enough to be weaned;
    adjusting said weaning gate to become a one-way gate;
    allowing said calves to enter said independent paddock through said one-way gate which will then prevent said calves from returning to said nursing paddock, wherein said calves are weaned from their mothers.

2. The method for weaning calves from their mothers of claim 1, providing the further steps of:
    providing a top horizontal bar at the top of said opening, and a bottom horizontal bar at the bottom of said opening;
    introducing a multiplicity of vertical bars having an adjustable top clamps to attach to said top horizontal bar and an adjustable bottom clamp to attach to said bottom bar;
    sliding said vertical bars horizontally to adjust the horizontal opening of said weaning gate.

3. The method for weaning calves from their mothers of claim 2, providing the further steps of:
    providing at least two adjustable horizontal bar mounts having hinge loops, wherein said horizontal bar mounts are configured to adjustably attach to said vertical bars;
    attaching said adjustable horizontal bar mounts to at least two of said vertical bars;
    adjusting the height of said adjustable horizontal bar mounts;
    inserting an elongated pin into said hinge loops to create a bar across said opening to adjust the vertical opening of said weaning gate.

4. The method for weaning calves from their mothers of claim 2, including the further steps of:
    attaching top hinges at said adjustable top clamps;
    providing a "U" shaped swinging bar gate having two hinged tube ends;
    attaching said swinging bar gate by inserting an elongated pin through said hinged tube ends and said top hinges; thereby creating a one-way gate.

5. The method for weaning calves from their mothers of claim 2, wherein said vertical bars are telescoping to allow attachment between said top horizontal bar and said bottom horizontal bar of any sized opening.

6. The method for weaning calves from their mothers of claim 4, wherein said swinging bar gate includes two vertical sides, and wherein said two vertical sides are telescoping to allow the horizontal adjustment of said swinging bar gate.

\* \* \* \* \*